(12) United States Patent
Terry

(10) Patent No.: US 9,474,423 B2
(45) Date of Patent: Oct. 25, 2016

(54) SEAT HAVING BUILT-IN WASTE COMPARTMENT

(71) Applicant: Tiffany Terry, Forest Park, GA (US)

(72) Inventor: Tiffany Terry, Forest Park, GA (US)

( * ) Notice: Subject to any disclaimer, the term of this patent is extended or adjusted under 35 U.S.C. 154(b) by 0 days.

(21) Appl. No.: 14/717,411

(22) Filed: May 20, 2015

(65) Prior Publication Data
US 2015/0335215 A1 Nov. 26, 2015

Related U.S. Application Data

(60) Provisional application No. 62/000,624, filed on May 20, 2014.

(51) Int. Cl.
| | | |
|---|---|---|
| *A47K 11/04* | (2006.01) | |
| *A47K 11/12* | (2006.01) | |
| *B60R 15/04* | (2006.01) | |
| *B60N 2/44* | (2006.01) | |
| *A47C 7/00* | (2006.01) | |

(52) U.S. Cl.
CPC .................. *A47K 11/04* (2013.01); *A47C 7/00* (2013.01); *A47K 11/12* (2013.01); *B60N 2/44* (2013.01); *B60R 15/04* (2013.01)

(58) Field of Classification Search
CPC ........ A47K 11/04; A47K 11/12; A47C 7/00; B60R 15/04; B60N 2/44; E03D 13/00

USPC ............................................................ 4/458
See application file for complete search history.

(56) References Cited

U.S. PATENT DOCUMENTS

| | | | |
|---|---|---|---|
| 1,569,571 | A | 1/1926 | Pew |
| 1,718,034 | A | 6/1929 | Davis |
| 3,383,713 | A | 5/1968 | Adams |
| 5,285,532 | A | 2/1994 | Sealy |
| 5,956,782 | A | 9/1999 | Olguin |
| 9,194,115 | B1 * | 11/2015 | Green ..................... E03D 13/00 |

* cited by examiner

*Primary Examiner* — Tuan N Nguyen
(74) *Attorney, Agent, or Firm* — Global Intellectual Property Agency, LLC; Daniel Boudwin

(57) ABSTRACT

A seat having built-in waste compartment for urinating, vomiting, or defecating therein. The seat having built-in waste compartment includes a container disposed in a seat, such as vehicle seat, gaming chair, stool, recliner, or the like. The seat includes an opening in the upper surface having a recessed area therein. The recessed area includes a container supported thereon. The container includes a base, one or more sidewalls, an aperture disposed in a sidewall, and an open upper end that can receive waste therein. The edge of the upper end of the container includes a flange that extends outward and rests on the upper surface of the seat, wherein the flange can be sat upon when the device is in use. The seat having built-in waste compartment further includes a tube that is connected to the aperture of the container and is able to receive urine therethough.

7 Claims, 3 Drawing Sheets

SEAT HAVING BUILT-IN WASTE COMPARTMENT

CROSS REFERENCE TO RELATED APPLICATION

This application claims the benefit of U.S. Provisional Application No. 62/000,624 filed on May 20, 2014. The above identified patent application is herein incorporated by reference in its entirety to provide continuity of disclosure.

BACKGROUND OF THE INVENTION

Field of the Invention

The present invention relates to seats having built-in waste compartment. More specifically, the present invention provides a seat having built-in waste compartment comprising a seat having a recessed area disposed on the upper surface thereof and a channel extending from the recessed area through a sidewall of the seat, wherein the channel is adapted to receive a tube therethrough. A container is supported on the recessed area, wherein the container is adapted to hold waste therein. The container comprises a base, one or more sidewalls, an open upper end, and an aperture in a sidewall. The edge of the upper end of the container includes a flange that extends outward and can be used as a seat when the device is in use. The seat having built-in waste compartment further comprises a tube having a first end connected to the aperture in the sidewall of the container in order to allow urine that is received through the second end of the tube to travel into the container. The second end of the tube is removably secured to a funnel, wherein the funnel is adapted to receive urine therein.

Many individuals suffer from urinary incontinence, which causes a person to have a sudden urge to urinate. The sudden urge can occur while seated in a vehicle, sitting in an office chair at work, or relaxing in a recliner at home. While some individuals resort to frequent bathroom breaks, this is not a convenient solution for those who are not located near a bathroom or if a bathroom is not available. When traveling in a vehicle there are times when an individual is unable to reach a bathroom due to traffic or other impedance. Some of these individuals choose to pull off to the side of the road in order to urinate or the like. However, the side of the road offers no privacy and is dangerous due to the risk of being struck by another vehicle in the proximity traveling at high speeds. Furthermore, the area in which an individual chooses to pull off onto the side of the road is typically unfamiliar and can comprise dangerous terrain. Additionally, many elderly individuals are immobile and experience difficulties walking to the bathroom. Therefore, there is an existing need in the prior art for a device that allows a user to relieve oneself in a vehicle or other type of seat, such as a gaming chair or a recliner.

It is submitted that the present invention substantially diverges in design elements from the prior art and consequently it is clear that there is a need in the art for an improvement to existing seats with a built-in waste compartment. In this regard the instant invention substantially fulfills these needs.

SUMMARY OF THE INVENTION

In view of the foregoing disadvantages inherent in the known types of seats having built-in waste compartment now present in the prior art, the present invention provides a new seat having built-in waste compartment wherein the same can be utilized for providing convenience for the user when relieving oneself in a seat when a bathroom is not available.

It is therefore an object of the present invention to provide a new and improved seat having built-in waste compartment that has all of the advantages of the prior art and none of the disadvantages.

It is another object of the present invention to provide a seat having built-in waste compartment comprising a seat having an opening and a recessed area disposed in the upper surface thereof, wherein a container, adapted to receive waste, is supported thereon.

Another object of the present invention is to provide a seat having built-in waste compartment wherein the container comprises a base, one or more sidewalls, an open upper end, and a flange outwardly extending from the upper end adapted to provide a seat for a user to sit thereon.

Yet another object of the present invention is to provide a seat having built-in waste compartment wherein the seat comprises a lid that removably seals the container and is adapted to provide a seat for a user to sit thereon.

Yet another object of the present invention is to provide a seat having built-in waste compartment wherein the sidewall of the container includes an aperture that is connected to a tube adapted to receive urine therethrough.

Yet another object of the present invention is to provide a seat having built-in waste compartment wherein the tube comprises a first end and a second end, wherein the first end is secured to the aperture on the container and the second end is removably secured to a funnel.

Another object of the present invention is to provide a seat having built-in waste compartment that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
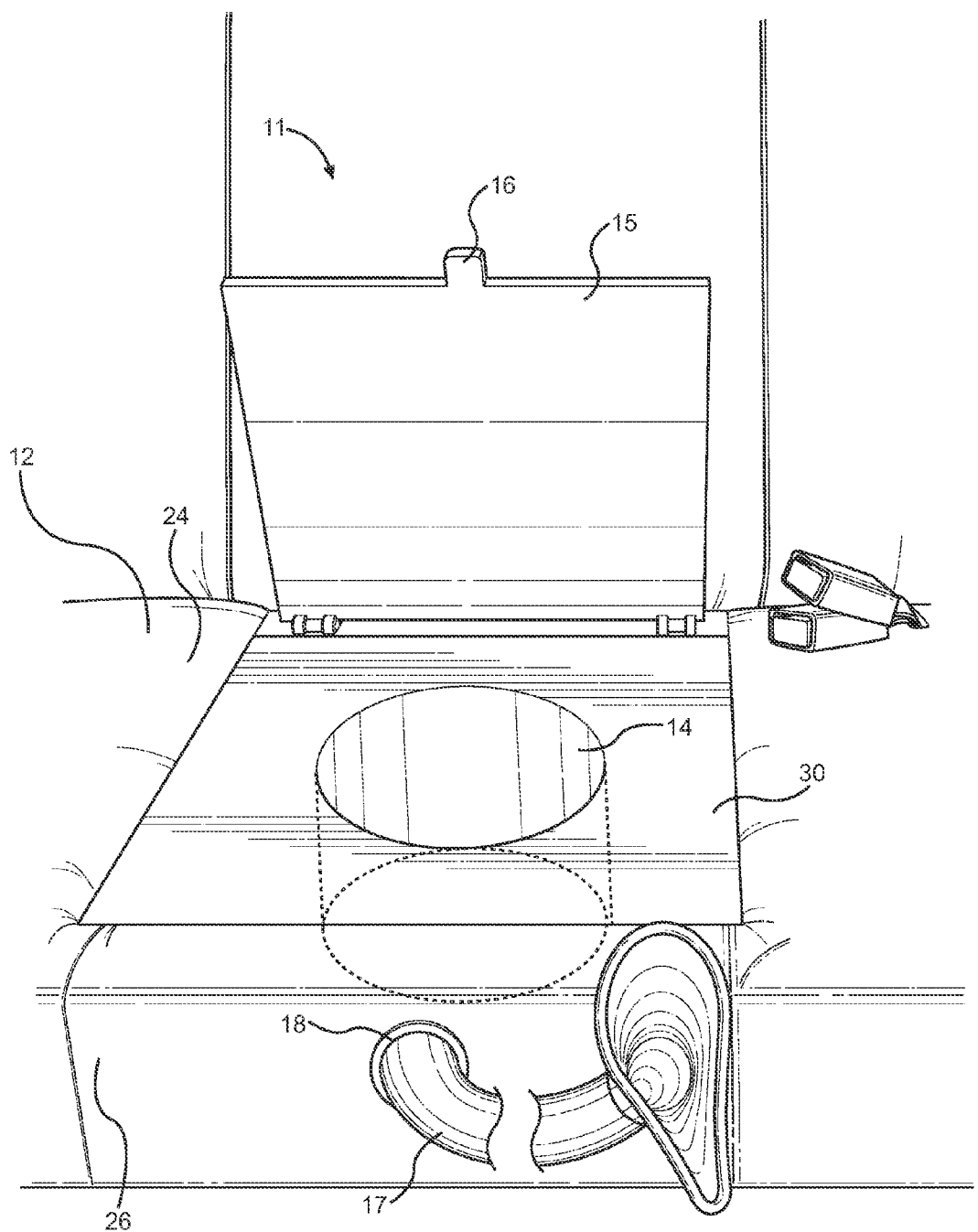
FIG. 1 shows a perspective view of an embodiment of the seat having built-in waste compartment.

Reference is made herein to the attached drawings. Like reference numerals are used throughout the drawings to depict like or similar elements of the seat having built-in waste compartment. For the purposes of presenting a brief and clear description of the present invention, the preferred embodiment will be discussed as used for relieving oneself in a seat. The figures are intended for representative purposes only and should not be considered to be limiting in any respect.

Figure 2:
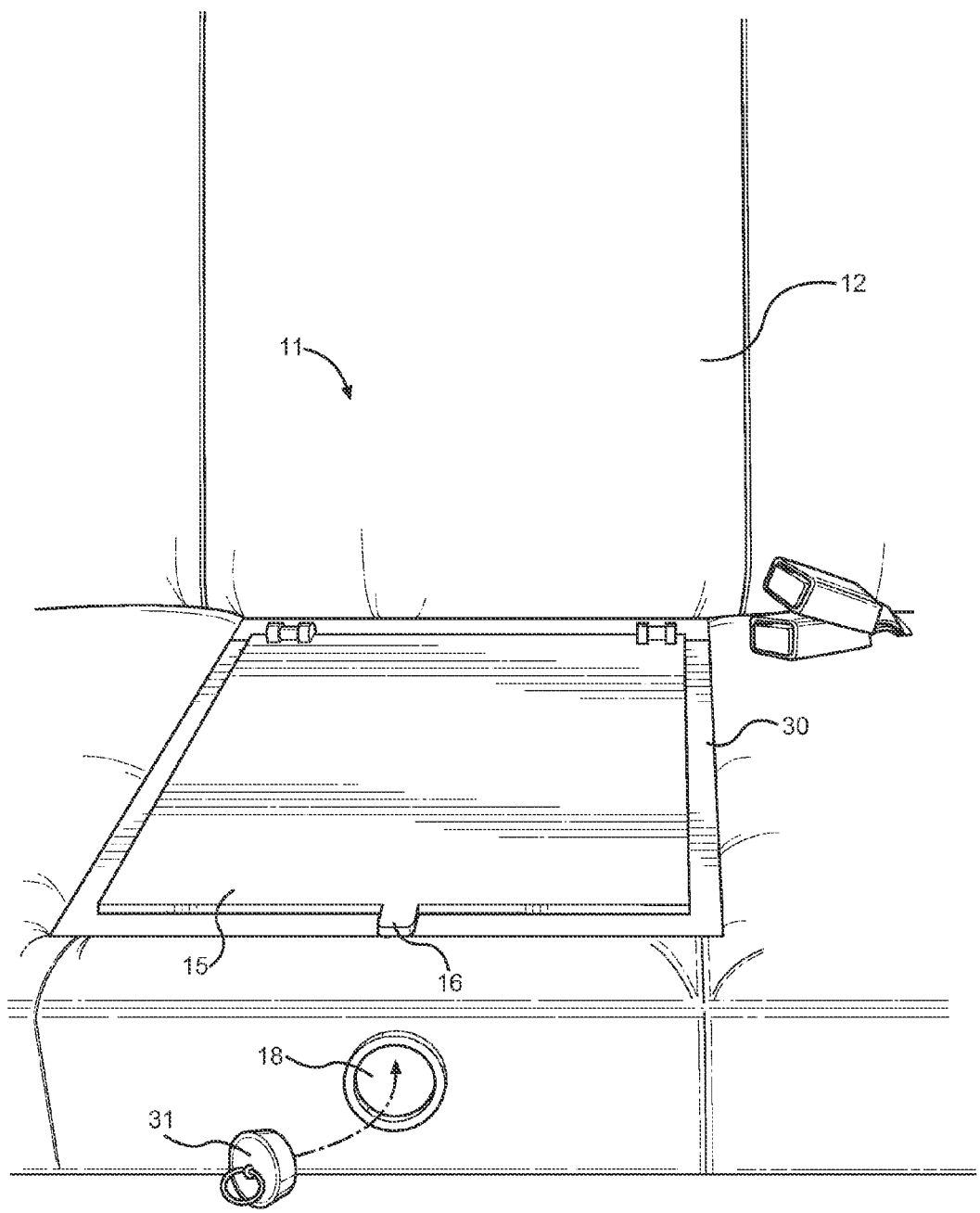
FIG. 2 shows a perspective view of an embodiment of the seat having built-in waste compartment wherein the waste compartment is in a closed configuration.

Referring now to FIGS. 1 and 2, there is shown a perspective view of an embodiment of the seat having built-in waste compartment and a perspective view of an embodiment of the seat having built-in waste compartment wherein the waste compartment is in a closed configuration, respectively. The seat having built-in waste compartment 11 comprises a seat 12 adapted to allow a user to sit thereon and a container 14 disposed in the seat 12 that allows a user to relieve oneself therein. The container 14 is secured to a tube 17 adapted to receive urine therethrough, wherein the tube 17 is disposed through the seat 12. The seat 12 can be part of any suitable sitting apparatus, such as vehicle seat, a gaming chair, a stool, a recliner, a couch, a bench, an armchair, and the like. The seat 12 comprises a base, one or more sidewalls 26, and an upper surface 24, wherein the upper surface 24 comprises an opening having a recessed area disposed therein. The seat 12 further comprises a channel 22 extending from the front facing sidewall 26 to the recessed area (as referenced in FIG. 3, 22). The channel 22 is adapted to receive the tube 17 therethrough. The opening 18 of the channel 22 disposed on the sidewall 26 and is adapted to be removably covered by a plug 31 when the tube 17 is not in use and removed from the channel 22. The diameter of the opening of the channel 22 is the same as the diameter of the plug 31 so as to create a seal therebetween. The plug 31 prevents any odor from escaping the recessed area in the seat 12.

The recessed area forms the section of the seat 12 in which the container 14 is disposed. The recessed area is centrally positioned relative to the upper surface of the seat 12 in order to allow the container 14 to be positioned beneath a user when in operation. The recessed area can be any suitable shape as long as the container 14 is able to fit therein. The recessed area supports the container 14 in an upright position, wherein the container 14 is adapted to receive waste therein.

The container 14 comprises a base, one or more sidewalls, and an open upper end, wherein the base of the container 14 rests flush against the base of the recessed area. In some embodiments, the base of the recessed area comprises an indentation adapted to receive the base of the container 14 therein. The shape of the indentation corresponds to the shape of the base of the container 14. The indentation provides a ledge that prevents the container 14 from shifting within the seat 12. In other embodiments, the container 14 can be removably secured to the seat by any suitable fastener, such as hook and loop material, disposed between the recessed area and the container 14.

The container 14 further comprises a flange 30 outwardly extending from the upper end thereof, wherein the flange 30 is perpendicular to the sidewalls of the container 14. The flange 30 is rectangular in shape and rests on the upper surface 24 surrounding the opening of the seat 12. The flange 30 is adapted to provide a surface for the user to sit thereon when the container 14 is in use. In some embodiments, the flange 30 is contoured to the shape of the user's bottom area in order to provide added comfort. The flange 30, container 14, and tube 17 are adapted to be removed from the seat 12 in order to clean the flange 30, container 14, and tube 17 after use.

The seat 12 further comprises a lid 15 pivotally attached to the upper surface 24 thereof via one or more hinges. The lid 15 is adapted to be sat upon and seal the container 14 in order to allow the seat having built-in waste compartment 11 to function as a conventional sitting apparatus and to prevent any odors from escaping therefrom. The lid 15 includes a tab 16 disposed on the edge thereof in order to allow the lid 15 to be lifted from the closed orientation. The lid 15 is rectangular in shape and is adapted to rest on the flange 30 when in a closed orientation. When the flange 30 is removed from the recessed area of the seat 12, the lid 15 can rest directly on the upper surface 24 of the seat 12. In some embodiments, the upper surface of the lid 15 comprises a cushion so as to provide comfort to a user when he or she is seated thereon.

Figure 3:
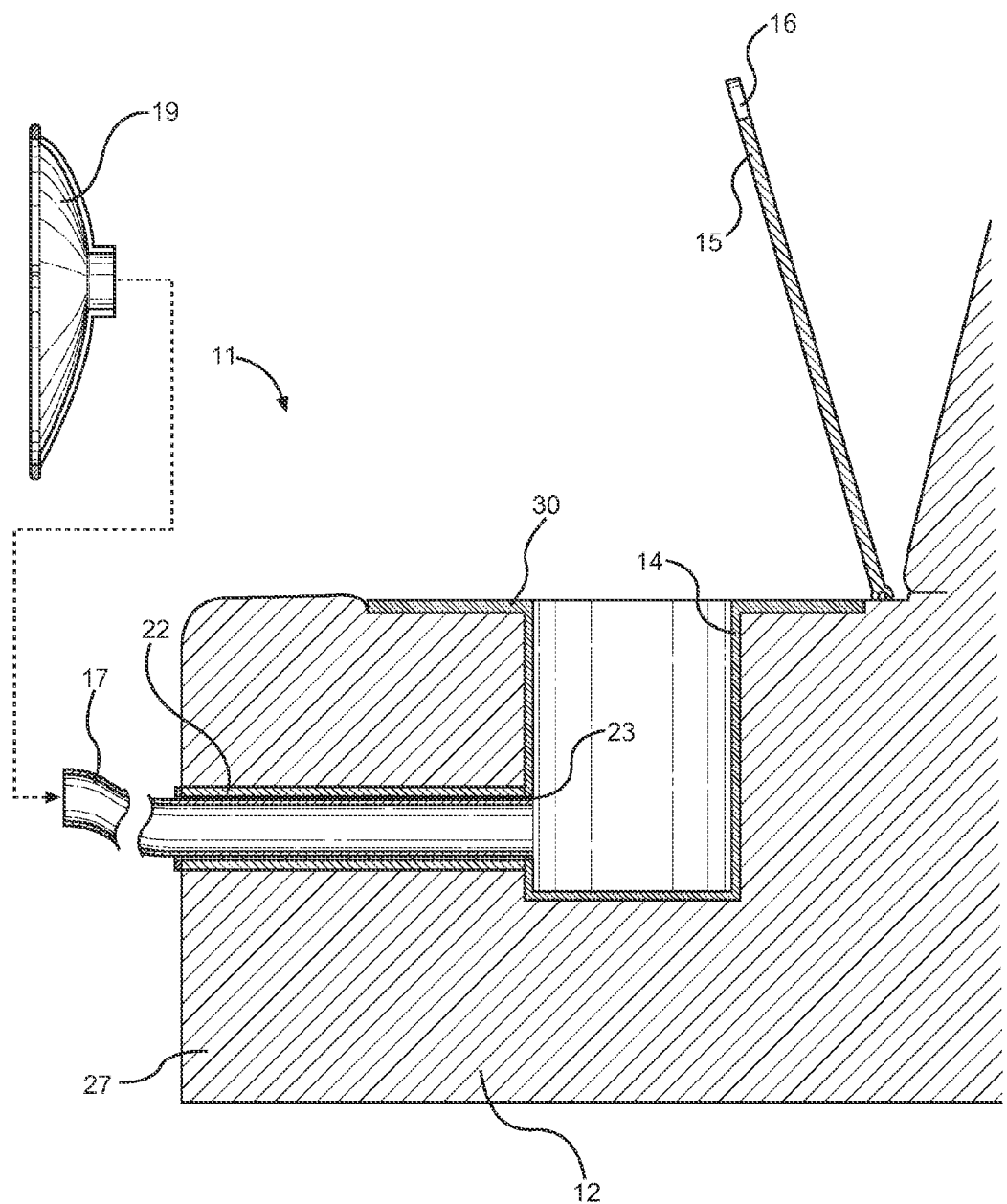
FIG. 3 shows a cross sectional view of an embodiment of the seat having built-in waste compartment.

Referring now to FIG. 3, there is shown a cross sectional view of an embodiment of the seat having built-in waste compartment. The container 14 is cylindrical in shape and comprises an aperture 23 disposed on a sidewall. The aperture 23 disposed on the container 14 is positioned on the sidewall facing towards the front section 27 of the seat 12. The aperture 23 is secured to the tube 17, wherein the tube 17 is adapted to receive and allow urine to pass therethrough into the container 14. The tube 17 is flexible and comprises a first end opposing a second end, wherein the first end is secured to the aperture 23 disposed on the container 14. The tube 17 and the container 14 are integral to one another. The second end of the tube 17 is removably secured to a funnel 19 into which a user can urinate. The funnel 19 is triangular in shape and, in some embodiments, comprises a cushion disposed along the upper edge in order to provide comfort to the user. In some embodiments, the first end of the tube 17 is removably secured to the aperture 23 disposed on the container 14 so as to allow the tube 17 to be removed by the user if not required when relieving oneself. The first end can be removably secured by any suitable fastener, such as threading included on the first end of the tube 17 and the perimeter of the aperture 23 so the tube 17 can be screwed onto the container 14.

The channel 22 disposed through the seat 12 is elongated and horizontally extends from the recessed area to the front facing sidewall. The channel 22 is adapted to receive the tube 17 therethrough. The channel 22 and the aperture 23 of the container 14 are aligned so the tube 17 can be disposed therethrough in a linear orientation. In some embodiments, there is an open area disposed between the recessed are of the seat 12 and the exterior of the container 14. The open area is adapted to receive the tube 17 therein so as to store the tube 17 in a compact configuration.

In operation, the lid 15 is lifted via the tab 16 so as to expose the container 14 thereunder. The user sits on the flange 30 of the container 14 or squats over the opening of the container 14. Alternatively, the user can urinate into the funnel 19 such that their urine passes through the tube 17 and into the container 14. When finished relieving oneself, the user detaches the funnel 19 and removes the tube 17 from the channel 22 in the seat 12. The user then removes the tube 17, the container 14, and the flange 30 for disposal of the waste within the container 14. If the user desires, the plug can be used to seal the opening of the channel 22 by attached thereto. In the alternative, the container 14 can be replaced within the recessed area and the tube 17 positioned through the channel 22 of the seat 12. The seat having built-in waste compartment 11 further comprises a plug 31 adapted to cover the opening of the channel 22 when the tube is removed therefrom. The diameter of the opening of the channel 22 is the same as the diameter of the plug so as to create a seal therebetween. In some embodiments, the container comprises a liner adapted to receive waste therein so only the liner needs to be removed in order to dispose of the waste.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat having built-in waste compartment, comprising:
   a seat comprising a base, one or more sidewalls, and an upper surface, wherein said upper surface includes an opening thereon;
   a recessed area disposed in said opening of said upper surface of said seat;
   a channel disposed through said one or more sidewalls of said seat and extending to said recessed area, wherein said channel is adapted to receive a tube therethrough;
   a container comprising a base, one or more sidewalls, and an open upper end, wherein said container is positioned within said recessed area of said seat and is adapted to receive waste therein;
   an aperture disposed on said one or more sidewalls of said container adapted to receive said tube thereon;
   said tube having a first end and a second end, wherein said first end is secured to said opening of said container and said second end of said tube extends outward from said one or more sidewalls of said seat through said channel of said seat.

2. The seat having built-in waste compartment of claim 1, further comprising a funnel removably secured to said second end of said tube.

3. The seat having built-in waste compartment of claim 1, wherein an opening of said channel disposed in said one or more sidewalls is removably covered by a plug.

4. The seat having built-in waste compartment of claim 1, further comprising a lid pivotally secured to said upper surface of said seat adapted to be sat upon and seal said container.

5. The seat having built-in waste compartment of claim 4, wherein said lid is pivotally secured to said upper surface of said seat by one or more hinges.

6. The seat having built-in waste compartment of claim 4, wherein said lid comprises a tab disposed on an edge thereof adapted to assist a user in lifting said lid.

7. The seat having built-in waste compartment of claim 1, further comprising a flange outwardly extending from an edge of said open upper end of said container adapted to provide a seat for a user to sit thereon.

* * * * *